3,016,405
METAL CATALYZED PYROLYSIS OF
FLUOROMETHANES
Elwyn Raymond Lovejoy, Wilmington, Del., assignor to
E. I. du Pont de Nemours and Company, Wilmington,
Del., a corporation of Delaware
No Drawing. Filed Jan. 7, 1959, Ser. No. 785,323
16 Claims. (Cl. 260—648)

This invention relates to a method of preparing organic compounds containing fluorine and more particularly to a method of preparing fluorocarbons containing 2 to 4 carbon atoms from halocarbons containing only one carbon atom.

Compounds containing large amounts of fluorine are valuable in a variety of uses. Tetrafluoroethylene and hexafluoropropylene are valuable as intermediates for making high molecular weight polymers which have many industrial applications. Other fluorocarbons, useful as chemical intermediates, solvents, aerosol propellants, hydraulic fluids and dielectric media, include perfluorocyclobutane and perfluorocyclobutene.

Several methods are known in the prior art for preparing the forementioned fluorocarbons. Some of these methods involve a pyrolysis or a reaction with hydrogen at pyrolysis temperatures. High reaction temperatures, long contact times, low yields and low conversions are some of the characteristic disadvantages of these types of reactions. Lower temperature methods involve the use of expensive reagents and for that reason are not generally commercially feasible. No methods in the prior art are available to convert halocarbons containing one carbon atom to fluorocarbons containing two to four carbon atoms below pyrolysis temperatures.

It is an object of this invention to provide a process for preparing fluorocarbons containing 2 to 4 carbon atoms from halocarbons containing only one carbon atom. It is also an object of this invention to provide a process where the contact times are short and the starting materials are of low cost. It is another object of this invention to provide a process which produces said fluorocarbons in high yields over a wide range of conversions. It is still another object of this invention to provide a process for preparing fluorocarbons which is operable over an extremely wide range of temperatures.

The objects of this invention are accomplished by contacting a halocarbon of the structure:

$$Y_1-\underset{Y_2}{\overset{F}{C}}-X$$

where X is selected from the group consisting of chlorine and bromine, where $Y_1$ is selected from the group consisting of chlorine, bromine and fluorine, and where $Y_2$ is selected from the group consisting of fluorine, chlorine, bromine and hydrogen, with a molten metal selected from the group consisting of the metallic elements of groups IA, IB, IIA, IIB, IVA, VA and metal alloys of said elements.

The invention is operable over an extremely wide range of temperatures, but it is generally desirable to operate the process at a temperature of 100° C. to 1000° C. At low temperatures i.e., below 200° C., the conversion is low and at high temperatures i.e., above 800° C., the conversion is very high. Above 800° C., however, the yields decrease as side reactions become more predominant. Some side reactions which occur at the high temperatures are disproportionation of the starting material and complete dehalogenation of the starting material to carbon and metal halides. The optimum temperature varies for each metal and metal alloy and for each halocarbon. The more reactive metals, such as sodium and sodium alloys, are generally used at a temperature just above their melting points while less reactive metals must be heated 200° C. to 600° C. above their melting points. In general, higher temperatures tend to increase yields of higher fluorocarbons. Using inexpensive commercially available metals, the preferred temperature is between 350° C. to 650° C.

The hydrocarbons which are useful as starting materials for this invention include dichlorodifluoromethane, chlorobromodifluoromethane, chlorodifluoromethane, dibromodifluromethane, bromodifluoromethane, trichlorofluoromethane, dichlorofluoromethane, tribromofluoromethane, dibromofluoromethane, dichlorobromofluoromethane, chlorobromofluoromethane, chlorodibromofluoromethane, chlorotrifluoromethane and bromotrifluoromethane. The preferred starting materials are dichlorodifluoromethane, chlorodifluoromethane, chlorotrifluoromethane, and dibromodifluoromethane.

The preferred way of contacting the reaction gas and the molten metal is by passing the gas through a pool of molten metal. The metal halides formed as side products are generally less dense than the metals and therefore float on the surface of the metal allowing the continuous contact of gas with molten metal. Merely passing the gas over the metal does not constitute a satisfactory method since the coating of the metal with the halide prevents further reaction. Other methods of contacting the reaction gas and the molten metal will be apparent to those skilled in the art. The contact times for this reaction are quite short, the preferred range being 0.01 sec. to 2.0 sec. At low temperatures a longer contact time will be required to obtain a given conversion while at higher temperatures a much shorter contact time can be used to secure the same conversion. The optimum conditions of temperature and contact time, to result in a desirable combination of yield and conversion for any given reactor, can be readily determined by one skilled in the art.

The term "fluorocarbon" as used herein, means compounds which contain at least fluorine and carbon. The term "halocarbon" as used herein, means compounds which contain at least carbon and a halogen.

As used herein, the term "percent yield" and "percent conversion" mean:

Percent conversion $= \dfrac{\text{total moles of starting material converted to products}}{\text{total moles of starting material supplied}} \times 100$ Percent yield $= \dfrac{\text{moles of given product} \times \text{moles of starting material theoretically required to form one mole of the given product}}{\text{total moles of starting material converted to products}} \times 100$ As used herein, the metals of group IA include Li, Na, K, Rb, Cs, and Fr; the metals of group IIA include Be, Mg, Ca, Sr, Ba, and Ra; the metals of group IB include Cu, Ag, and Au; the metals of group IIB include Zn, Cd, and Hg; the metals of group IVA include Ge, Sn, and Pb; and the metals of group VA include Sb and Bi. These groupings were taken from the Periodic Table of Elements as shown on page 573 of General Inorganic Chemistry by Sneed and Maynard, D. Van Nostrand, Inc., New York, 1942.

In order to more clearly illustrate our invention, the preferred modes of carrying out the same, and the advantageous results to be obtained thereby, the following examples are included.

EXAMPLES I TO XX

Into a nickel reactor having a volume equivalent to 100 parts of water was charged 200 parts of metal or metal alloy. The reactor was in the shape of a long thin upright cylinder with a diameter to height ratio of about 1:8. The reactor was equipped with a gas inlet tube which entered the top of said reactor and extended within ½ diameter of the bottom, a thermocouple well which extended into the molten metal, and a gas outlet tube near the top of the reactor. The bottom of the reactor was sealed permanently and the top was equipped with a removable cover so that the reactor could be easily cleaned and metal easily charged. The reaction gas mixture, maintained at atmospheric pressure, entered the gas inlet tube, passed through the molten metal, and left the reactor through the gas exit tube. The gaseous reaction product was then passed through a solids trap, a 15% NaOH solution, and a $CaSO_4$ drying agent. After the reaction had been operating smoothly for five minutes, dry gas samples were taken from the product stream and analyzed as to type and yield of product by gas chromatography and mass spectrometry. The results of Examples I through XX appear in Table 1. Except for Examples X and XIV, a gas mixture consisting of 50% helium, used as carrier gas, and 50% reaction gas was fed at a rate of 3 liters/minute-kilogram of metal charged. In Example X, a mixture consisting of 75% helium carrier gas and 25% reaction gas was fed at a rate of 6 liters/minute-kilogram of metal charged. In Example XIV, a gas consisting of 100% reaction gas was fed at a rate of 3 liters/minute-kilogram of metal charged. Gas volumes were measured at room temperature and atmospheric pressure. The reaction gas used in each run is given in column 2 of Table 1. Column 3 lists the metal or metal alloy charged to the reactor. Column 4 gives the temperature in the reactor as measured by the thermocouple immersed below the level of the metal. Column 5 gives the percent of the reactive gas converted to other fluorocarbons. Subsequent columns give the yields of the respective fluorocarbons listed.

Halocarbon starting materials containing only one fluorine atom give results similar to the foregoing examples, except the yields of compounds which contain large numbers of fluorine atoms are necessarily lower. Products of interest which can be prepared in good yields from these starting materials include many chlorofluorocarbons and fluorohydrocarbons, more particularly $CF_2=CCl_2$, $CFCl=CFCl$, and $CFH=CFH$.

Starting materials similar to those of the foregoing examples in which all the chlorine atoms in the halocarbon are replaced by bromine atoms are operable in this invention. The process can be carried out at a temperature up to 200° C. lower and achieve the same conversions when using the bromine compounds. Starting materials similar to the foregoing examples, except not all the chlorine atoms in the halocarbon are replaced by bromine atoms, react more nearly like halocarbons in which no chlorine atoms had been replaced by bromine atoms, than halocarbons in which all the chlorine atoms had been replaced by bromine atoms. For example, bromochlorodifluoromethane would react more nearly like dichlorodifluoromethane than it would like dibromodifluoromethane.

EXAMPLES XXI TO XXIII

Using substantially the equipment and procedure of the previous examples the halocarbon gas was heated to the reaction temperature by passing it through the nickel tube in the absence of a liquid metal or metal alloy. The results of these examples are illustrated in Table 2. No carrier gas was used in these reactions. The reaction gas is listed in column 2 of the table; the contact time for each of the runs is given in column 3. Column 4 gives the temperature in the reactor as measured by a thermocouple. The subsequent columns give the conversion of the reactant and the yield of each of the products. As expected, the conversions were quite low and mainly disproportionation products were formed.

Table 1

| Ex. | Reaction gas | Metal or metal alloy, percent | Temperature °C. | Percent conversion | Percent yield $CF_2=CF_2$ | Percent yield $CF_4$ | Percent yield $CF_3-CF=CF_2$ | Percent yield $ClCF_2-CF_2Cl$ | Percent yield perfluorocyclobutene | Percent yield perfluorocyclobutane | Percent yield $CF_2=CFCl$ | Percent yield other chlorofluorocarbons | Percent yield other fluorocarbons containing no Cl | Impurities |
|---|---|---|---|---|---|---|---|---|---|---|---|---|---|---|
| 1 | $CCl_2F_2$ | 100 Pb | 400 | 0.4 | | | | | | | | | | |
| 2 | $CCl_2F_2$ | 100 Pb | 505 | 3.9 | 87.3 | 5.1 | | | | | | | | |
| 3 | $CCl_2F_2$ | 100 Sn | 640 | 5.7 | 67.8 | 11.9 | 10.2 | 10.2 | | | | | | |
| 4 | $CCl_2F_2$ | 100 Zn | 550 | 66.0 | 72.8 | 13.7 | 7.3 | | 6.3 | | | | | 7.7 |
| 5 | $CCl_2F_2$ | 80 Pb / 20 Cd | 445 | 1.6 | 100.0 | | | | | | | | | |
| 6 | $CCl_2F_2$ | 80 Pb / 20 Cd | 550 | 45.0 | 85.2 | 0.7 | 6.6 | | 1.4 | 4.7 | | 1.4 | | |
| 7 | $CCl_2F_2$ | 70 Pb / 30 Bi | 545 | 5.4 | 80.0 | 3.6 | 5.5 | 3.6 | | 7.3 | | | | |
| 8 | $CCl_2F_2$ | 65 Pb / 35 Sb | 600 | 3.2 | 84.9 | 3.0 | | 12.1 | | | | | | |
| 9 | $CCl_2F_2$ | 90 Pb / 10 Zn | 505 | 8.2 | 83.8 | | | 2.3 | | 1.2 | 2.3 | 3.5 | 7.0 | |
| 10 | $CCl_2F_2$ | 70 Pb / 30 Zn | 500 | 20.0 | 94.2 | | 2.5 | 0.8 | | | | | | |
| 11 | $CCl_2F_2$ | 95 Pb / 5 Na | 350–440 | 12.1 | 76.0 | 2.3 | | 9.3 | | 12.4 | | | | 2.5 |
| 12 | $CF_4$ | 100 Pb | 820 | 0.0 | | | | | | | | | | |
| 13 | $CF_4$ | 80 Pb / 20 Zn | 650 | 0.0 | | | | | | | | | | |
| 14 | $CCl_2F_2$ | 90 Pb / 10 Zn | 575 | 2.2 | 72.8 | | 13.6 | 9.1 | | | | 4.5 | | |
| 15 | $CCl_2F_2$ | 90 Pb / 10 Cu | 595 | 4.2 | 55.8 | 34.9 | | 9.3 | | | | | | |
| 16 | $CCl_2F_2$ | 70 Pb / 15 Cu | 545–570 | 3.3 | 84.8 | 15.2 | | | | | | | | |
| 17 | $CCl_2F_2$ | 100 Pb | 705 | 20.9 | 38.1 | | 16.5 | 29.7 | | 5.1 | 5.1 | 2.5 | 1.7 | 1.3 |
| 18 | $CHClF_2$ | 100 Pb | 600 | 12.2 | 74.9 | | 6.9 | | 3.0 | 3.0 | | 1.5 | 10.7 | |
| 19 | $CF_3Cl$ | 100 Pb | 710 | 16.7 | 33.5 | | 37.3 | 2.2 | | | 2.2 | | 22.1 | 2.7 |
| 20 | $CHClF_2$ | 80 Pb / 20 Zn | 650–670 | 84.0 | 9.1 | 7.3 | 6.5 | | 4.6 | 0.7 | | 2.2 | [1] 69.5 | |

[1] $CF_2=CH_2$, 13.8; $CF_2=CFH$, 21.4; $CF_3H$, 18.0; $CF_3CF_2H$, 4.3; $CF_2H_2$, 7.5; $CF_3CF_3$, 2.8; $(CF_3)_2C=CF_2$, 1.7.

Table 2

| Ex. | Reaction gas | Contact time, sec. | Temp-°C | Percent Conversion | Percent yield CCl₂F | Percent yield CClF₃ | Percent Yield ClCF₂—ClCF₂ |
|---|---|---|---|---|---|---|---|
| 21 | CCl₂F₂ | 5 | 608 | 0.6 | 66.7 | 33.3 | |
| 22 | CCl₂F₂ | 5 | 705 | 2.3 | 13.0 | 61.0 | 26.0 |
| 23 | CCl₂F₂ | 2.5 | 705 | 0.7 | 28.5 | 71.5 | |

The foregoing examples are not intended as limiting the scope of the present invention but are only illustrations thereof. It should be apparent that the process is very versatile and many modifications will be apparent to one skilled in the art without departing from the spirit of the invention. For instance, the examples were run at approximately ambient atmospheric pressure; it is clear that the reaction is independent of pressure and can be carried out at subatmospheric or superatmospheric pressure. Pressure changes will affect the composition of the product, but not the reaction itself. Thus, as the pressure is increased the process tends to yield more of the higher molecular weight fluorocarbons. Therefore if a high yield of perfluorocyclobutane is desired, the pressure is increased and the temperature and contact time adjusted to give the optimum results. The metal can also be supplied to the reactor continuously and the halide removed continuously as it is formed, so that the entire process is a continuous one.

The process of the present invention is useful in preparing tetrafluoroethylene, hexafluoropropylene, perfluorocyclobutane, and perfluorocyclobutene in commercial quantities using readily available starting materials. The advantages of this process over the prior art are the combination of moderate reaction temperatures with low contact times, variety of starting materials useful in the process, and low cost compared to other moderate temperature processes or pyrolytic processes.

I claim:

1. A process for preparing fluorocarbons containing 2 to 4 carbon atoms which comprises contacting a halocarbon of the structure:

where X is selected from the group consisting of chlorine and bromine and where $Y_1$ is selected from the group consisting of chlorine, fluorine, and bromine, and where $Y_2$ is selected from the group consisting of fluorine, chlorine, bromine and hydrogen, with a molten metal selected from the group consisting of lead, tin, zinc and lead alloys of metallic elements of groups I, II, IVA and VA of the Periodic Table of Elements.

2. The process of claim 1 wherein the temperature is between 100° C. and 1000° C.

3. The process of claim 1 wherein the temperature is between 350° C. and 650° C.

4. The process of claim 1 wherein the molten metal is lead.

5. The process of claim 1 wherein the molten metal is zinc.

6. The process of claim 1 wherein the molten metal is a metal alloy of lead and a metallic element of group I.

7. The process of claim 1 wherein the molten metal is a metal alloy of lead and a metallic element of group II.

8. The process of claim 5 wherein the molten metal is zinc maintained at a temperature of 450° to 600° C.

9. The process of claim 6 wherein the molten metal is a metal alloy comprising 1% to 25% sodium and complementally 99% to 75% lead, maintained at a temperature of 350° C. to 550° C.

10. The process of claim 1 wherein the halocarbon is dichlorodifluoromethane.

11. The process of claim 1 wherein the halocarbon is chlorotrifluoromethane.

12. The process of claim 1 wherein the halocarbon is chlorodifluoromethane.

13. The process of claim 1 wherein the halocarbon is dibromodifluoromethane.

14. A process for preparing fluorocarbons containing 2 to 4 carbon atoms which comprises contacting dichlorodifluoromethane with a molten metallic alloy comprising 1 to 25% sodium and complementally 99 to 75% lead at a temperature of 350° C. to 550° C.

15. A process for preparing fluorocarbons containing 2 to 4 carbon atoms which comprises contacting dichlorodifluoromethane with molten zinc at a temperature of 450° C. to 600° C.

16. A process for preparing fluorocarbons containing 2 to 4 carbon atoms which comprises contacting dichlorodifluoromethane with molten lead at a temperature of 450° C. to 600° C.

References Cited in the file of this patent

UNITED STATES PATENTS

| 2,687,440 | McGrew et al. | Aug. 24, 1954 |
| 2,687,441 | Price et al. | Aug. 24, 1954 |

UNITED STATES PATENT OFFICE
CERTIFICATION OF CORRECTION

Patent No. 3,016,405 January 9, 1962

Elwyn Raymond Lovejoy

It is hereby certified that error appears in the above numbered patent requiring correction and that the said Letters Patent should read as corrected below.

Column 2, line 9, for "hydrocarbons" read -- halocarbons --; line 44, for "term" read -- terms --; columns 3 and 4, Table I, third column thereof, opposite "16", for $$\begin{cases} 70 \text{ Pb} \\ 15 \text{ Cu} \end{cases} \text{ read } \begin{cases} 70 \text{ Pb} \\ 15 \text{ Zn} \\ 15 \text{ Cu} \end{cases}$$

column 5, Table 2, next to the last column thereof, opposite "21", for "33 3" read -- 33.3 --.

Signed and sealed this 19th day of June 1962.

(SEAL)
Attest:

ERNEST W. SWIDER
Attesting Officer

DAVID L. LADD
Commissioner of Paten